Oct. 27, 1931.   L. ROEBEL   1,829,542
THRUST BEARING
Filed May 13, 1926
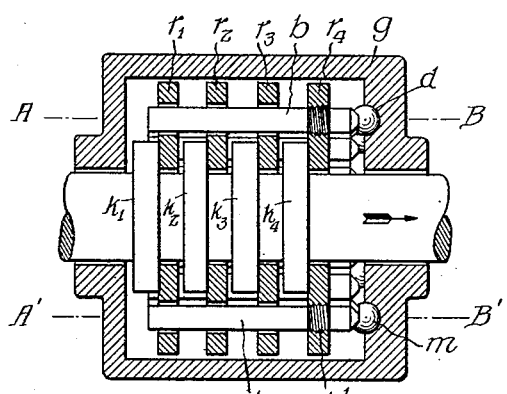
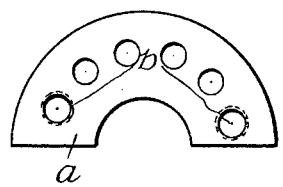
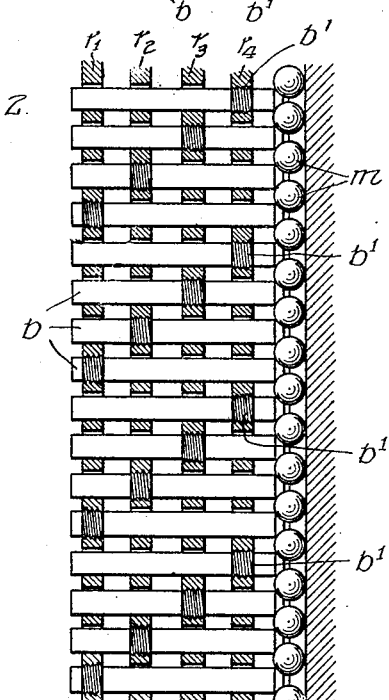
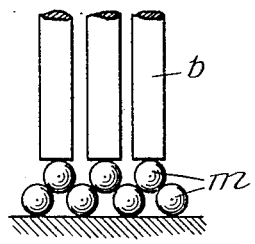
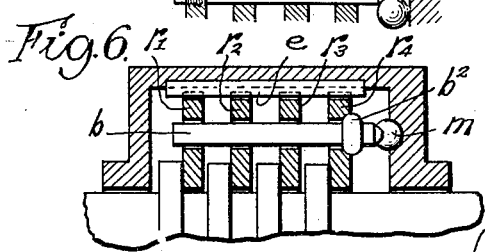
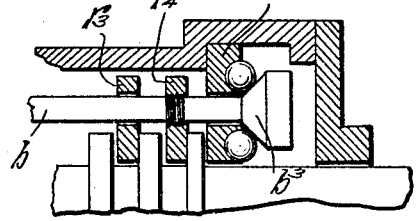
Inventor:
Ludwig Roebel, Patented Oct. 27, 1931

1,829,542

UNITED STATES PATENT OFFICE

LUDWIG ROEBEL, OF MANNHEIM, GERMANY, ASSIGNOR TO AKTIENGESELLSCHAFT BROWN BOVERI & CIE., OF BADEN, SWITZERLAND, A JOINT-STOCK COMPANY OF SWITZERLAND

THRUST BEARING

Application filed May 13, 1926, Serial No. 108,763, and in Germany July 1, 1925.

This invention relates to thrust bearing for rotating or stationary machine parts, and pertains particularly to thrust bearings of the multiple collar type, in which the pressure of the supported element is to be distributed among a number of supporting members spaced axially.

The general object of the invention is the provision of a construction whereby the thrust pressure is automatically equalized among the several thrust collars or supporting members.

Another object is the provision of such a construction which facilitates lubrication of the bearing surfaces.

Other objects will be pointed out or indicated hereinafter or obvious to one skilled in the art upon an understanding of the invention.

In the drawings forming a part of this specification I show one form in which the invention may be embodied, and various modified details, but it is to be understood that these are presented for purpose of illustration only and are not to be construed as imposing on the claims limitations not required by the prior art. In the drawings, Fig. 1 is a longitudinal section on a diameter of a bearing construction demonstrating the invention, Fig. 2 is a lineal development of said assembly on a cylindrical section through the lines A—B and A'—B', Fig. 3 is a detail showing a face view of a bearing ring segment, Fig. 4 is a detail showing a longitudinal section of a modified form of thrust equalizing stud, and Fig. 5 is a detail illustrating a modified arrangement of equalizing members.

Fig. 6 is a detail illustrating another modified construction, and Fig. 7 is a detail illustrating a third modified construction.

It is frequently found with large thrust bearings of the multiple collar type that the load is unequally distributed over the bearing surface. Thus individual collars will be found to be taking more than their correct proportion of the load or the load intensity becomes excessive at certain points with the result that the oil is squeezed out, the bearing commences to run hot, and a complete breakdown may ensue.

To obviate this difficulty, thrust bearings have been built with a single collar only, but with the annular bearing surface on which the collar runs divided into a larger number of segments which are mechanically interconnected in such a way that if one segment becomes overloaded it yields slightly and in so doing causes the neighboring segments to be pressed with greater force against the collar. In this way a uniform distribution of the load between the segments is obtained. When very heavy axial loads have to be carried, however, a single collar, even when uniformly loaded, may be inadequate. The difficulty cannot be overcome by simply arranging a number of such collars in series, since this gives no assurance that the total axial load is even approximately uniformly distributed between all the collars.

According to the present invention, the movements of the individual bearing rings, systems of segments etc., on which the shaft collars run are transmitted by studs or bolts which may be either in tension or compression. Each stud is connected to one of the bearing rings, systems of segments, etc., in such a way that it is able to transmit the load carried by same, and the suitably shaped ends of the studs are supported each on two balls, rollers, prisms, or similar elements in such a manner that if one of the studs is displaced in the direction of the axial load the above-mentioned elements are forced apart with the result that the adjacent studs are displaced in the opposite direction.

In the form illustrated herein, Fig. 1 represents a bearing having four collars $k^1$—$k^4$ which are carried on the shaft and run on four bearing rings $r^1$—$r^4$. Holes are provided in the rings outside the circumference of the collars, through which holes the studs $b$ pass (the figure shows an arrangement for 16 of these studs). Four of these studs at equidistant spacing are rigidly joined, by screwing as at $b'$ for example, to one of the bearing rings, but are capable of motion with respect to the other three rings. Another four studs are rigidly joined to another bearing ring, and so on.

Fig. 2 represents the development of a cylindrical section through the bearing rings and coaxial with the shaft, its position being indicated by the lines AB and A' B' in the figure. The ends of the studs which are supported by the stationary part of the bearing $g$ are made in the shape of truncated cones. The conical surfaces rest on balls $m$ lying in an annular semi-circular groove $d$ in the housing. Thus, if one of the bearing rings receives too great a share of the load, it will be displaced in the direction of the arrow. The balls on which the studs attached to the ring in question rest will therefore be forced apart sideways, causing the remaining studs, together with the rings attached to them, to be displaced in the opposite axial direction, that is, against the load. This movement will continue until the load is once more equally distributed between all the rings.

The studs $b$ by means of which the load equalization is obtained need not be coned at the ends as described above, but can be simply formed with two inclined faces. If this is done, care must be taken that the line of symmetry to the two inclined faces passes through the bearing axis. This can be ensured by cutting the chamfers on a special piece $c$ which fits on a pin or reduced portion on the end of the stud as shown in Fig. 4. The piece $c$ can thus rotate relative to the stud.

Another method is to cut the studs off square and support them on a second row of balls as shown in Fig. 5. The ends may be slightly hollowed out if desired.

The arrangement as described is naturally capable of modification; the number of studs attached to each bearing ring may, for example, be other than four. The rigid connection between the studs and rings may be replaced by one which allows a certain freedom of movement and only transmits the pressure in an axial direction. This may take the form illustrated in Fig. 6, wherein spherical collars $b^2$ on the studs rest in hemispherical depressions formed in the rings to form a ball and socket joint. In this case the studs are free to take up an inclined position with regard to the rings and it may therefore be advisable to provide some means of preventing the set of rings from becoming twisted. For this purpose a groove can be cut in the circumference and a suitable key $e$ fitted to hold them against rotation while permitting axial or tilting movement. If necessary one of the balls may be prevented from moving laterally by suitable stops, or by other means.

Instead of balls other elements such as conical cylinders, prisms, etc., may be employed. The bearing can also be designed to take axial loads in both directions, in which case the number of rings should be one more than the number of collars and the studs are coned at both ends, so as to duplicate at the other end the arrangement shown at the right end of Fig. 1, two systems of balls, rollers, or prisms are provided as in the form shown.

To secure a more uniform distribution of the load on each ring, divided rings such as shown in Fig. 3 may be employed. When this is done care should be taken that the ends of the various rings do not lie in the same axial plane. The studs attached to each half ring may be located on a line parallel to the end faces and passing through the centre of gravity of the bearing face. Alternatively they may be arranged slightly asymmetrically as shown in Fig. 3, so that the leading edge $a$ of the half ring is under a somewhat lower intensity of pressure than the remainder of the bearing surface. In this way the entry of the lubricating oil between the rubbing surfaces is facilitated.

A thrust bearing designed for uniform load distribution as shown in Figs. 1 and 2 may also be arranged so that the studs are under tension instead of compression. This may be accomplished by arranging the studs $b$ to pass between the balls $m$ as shown in Fig. 7 and providing them with conical heads $b^3$ which bear on the balls. The stationary bearing surface for the balls would then consist of an annular plate $t$ provided with holes for the passage of the studs. Such an arrangement would be suitable for taking a load in one direction only, but there is no objection to extending the principle so as to allow of axial loads in both directions being taken.

What I claim is:

1. Thrust bearing construction comprising the combination with a thrust member and a supported member, of collars carried by the latter in axially spaced relationship, thrust rings abutting the collars, studs connected to respective thrust rings and movable longitudinally through the other rings and equalizing members cooperating with the studs.

2. In a thrust bearing, the combination with the supporting and supported members, of collars spaced axially on the latter, equalizing members supported on the supporting member, relatively movable thrust rings cooperating with the collars respectively, and axially movable thrust studs disposed at a distance from the supported member less than that from said supported member to the peripheries of the rings and connected to respective rings and cooperating with the equalizing members.

3. In a thrust bearing, the combination with a thrust supporting member and a shaft, of thrust collars carried by the shaft, three or more thrust rings cooperating respectively with the collars and axially movable relative to each other, thrust studs disposed at a distance from the shaft less than that from said shaft to the peripheries of the rings and cooperating with respective thrust rings to support the thrusts thereof, and equalizing members cooperating with the thrust studs and the thrust supporting members to equalize the thrust on all rings.

4. In a thrust bearing, the combination with a thrust supporting member and a shaft, of collars spaced axially on the shaft, thrust members cooperating each with a respective collar and movable axially to each other, thrust studs disposed at a distance from the shaft less than from said shaft to the peripheries of the rings and having supporting engagement with respective thrust members and equalizing members for transmitting movement from the studs supporting one of the thrust members to those supporting all the others in the opposite axial direction.

5. In a thrust bearing, the combination with a thrust supporting member and a shaft, of thrust collars carried by the latter, rings for receiving thrust of the respective collars, said rings being relatively movable in an axial direction, thrust transmitting members arranged in a series around the shaft at a distance therefrom less than that from said shaft to the peripheries of the rings and connected in groups to respective rings, and relatively movable equalizing elements cooperating with the thrust transmitting members.

6. In a thrust bearing, the combination with a bearing block and shaft, of thrust collars spaced axially on the latter, thrust rings for taking thrust from respective collars, axially extending studs connected in groups to respective rings for axial movement therewith and disposed at a distance from the shaft less than that from said shaft to the peripheries of said rings, and balls supported on the bearing block in wedging cooperation with said studs.

7. A thrust bearing comprising a stationary enclosing member, a rotating shaft extending through said enclosing member, collars secured to and axially spaced along said shaft, annular thrust members movable axially into engagement with said collars, means for joining said thrust members to prevent rotary movement thereof and disposed at a distance from the shaft less than that from said shaft to the peripheries of said thrust members, and means intermediate said enclosing member and said thrust member joining means to permit equal distribution of axial pressure thereon.

8. A thrust bearing comprising a stationary enclosing member, a rotating shaft extending through said enclosing member, spaced collars carried by said shaft, thrust rings spaced by and movable into engagement with said collars, studs joining said thrust rings to prevent rotation and permit axial movement thereof and disposed at a distance from the shaft less than that from said shaft to the peripheries of said rings, and equalizing members in movable contact with said enclosing member and cooperating with said studs to permit distribution of axial pressure on said thrust rings.

9. A thrust bearing comprising a stationary enclosing member having a groove in one end thereof, a rotating shaft extending into said enclosing member, spaced collars secured to said shaft within said enclosing member, thrust rings having opposed apertures and movable into engagement with said collars, studs extending through the apertures in said thrust rings, and balls resting in the groove in said enclosing member and cooperating with said studs to provide for distribution of axial pressure on said thrust rings.

In testimony whereof I have hereunto subscribed my name at Stuttgart on the 10th day of April, A. D. 1926.

LUDWIG ROEBEL.